3,083,220
PROCESS FOR THE PREPARATION OF
FLUOSULFONATES
William Lee Edens, New Castle, Del., assignor to E. I. du Pont de Nemours and Company, Wilmington, Del., a corporation of Delaware
No Drawing. Filed July 3, 1958, Ser. No. 746,345
5 Claims. (Cl. 260—456)

The process of the present invention relates to novel fluosulfonates and a method for their preparation, and more particularly to the preparation of novel fluosulfonates from fluorinated olefins.

The novel fluosulfonates of the present invention have the general formula

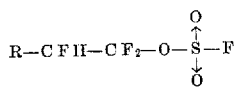

wherein R is a member of the class consisting of fluorine, perfluoroalkyl groups and omega-hydroperfluoroalkyl groups. The novel fluosulfonates are prepared by the reaction of concentrated sulfuric acid with a fluorinated olefin having the formula R—CF=CF$_2$, where R is as indicated above, at temperatures of 300 to 400° C., or by the reaction of fluosulfonic acid with the perfluorinated or substantially perfluorinated olefin at temperatures of 100 to 400° C.

In contrast to completely halogenated ethylene containing more than one halogen-type such as difluorodichloroethylene and trichlorofluoroethylene which do not form the fluosulfonates, it was found that perfluoroolefins and substantially perfluorinated olefins react to form the fluosulfonates of the present invention and, surprisingly so, it was found that these compounds could be prepared by reaction of sulfuric acid with the olefin in addition to the preparation by reaction with fluosulfonic acid.

The preparation is carried out by combining the reactants and heating the mixture at elevated temperatures. No catalysts or solvents are necessary. The quantities of the reagents may be greatly varied and are in no way critical to the formation of the fluosulfonates. In general, it is preferred to react substantially equimolar quantities of the acid with the olefin. The reaction is carried out at a temperature of 300° C. to 400° C. and preferably at 350° C., when sulfuric acid is employed and at a temperature of 100° C. to 400° C., and preferably at a temperature of 150° C., when fluosulfonic acid is employed. In general, the reaction is carried out at autogenous pressures, although higher or lower pressures may be employed if desirable.

The olefins which may be employed in the present invention are perfluoroolefins and omega-hydroperfluoroolefins. Representative examples of these olefins suitable in the formation of the fluosulfonates of the present invention include tetrafluoroethylene, and perfluoroalkyl and omega hydroperfluoroalkyl substituted perfluoroethylenes in which the alkyl groups are unsubstituted and straight chain, and contain up to 18 carbon atoms, such as perfluoropropene, perfluorobutene-1, perfluorohexene-1, perfluoroheptene-1, perfluorooctene-1, omegahydroperfluoroheptene-1, omegahydroperfluorodecene-1, perfluorododecene, perfluoropentadecene, etc.

The process of the present invention is further illustrated by the following examples:

*Example I*

Hexafluoropropene (150 g.) and 96% concentrated sulfuric acid (25 ml.) were charged into a platinum lined 320 ml. autoclave. The mixture was agitated for one hour at 350° C. under autogenous pressure. The light amber product was discharged, washed twice with water, dried over calcium sulfate and distilled through a 30 inch platinum spinning band column. There was obtained 37.6 g. (32%) of a clear colorless liquid product identified as β-hydroperfluoropropyl fluosulfonate having a boiling point of 75° to 76° C., a refractive index of $N_D^{25}=1.2865$.

*Analysis.*—Calculated for $C_3HF_7O_3S$: C, 14.4; H, 0.4; F, 53.2; S, 12.8; mol. wt. 250. Found: C, 15.5; H, 0.6; F, 52.8; S, 13.6; mol. wt. 248.

*Example II*

Hexafluoropropene (50 g.) and fluosulfonic acid (25 g.) were charged into a platinum lined 320 ml. autoclave. The mixture was agitated for 3 hours at 150° C. under autogenous pressure. The dark amber product was poured onto ice, washed twice with water and distilled. There was obtained 11.3 g. (18%) of β-hydroperfluoropropyl fluosulfonates boiling at 75–76° C.

*Example III*

Into an evacuated 320 ml. platinum lined autoclave was charged 36 ml. of fluosulfonic acid and 70 g. of tetrafluoroethylene. The reactor was agitated for 3 hours under autogenous pressure at 200° C. The reaction products were collected in an acetone-Dry-Ice bath and distilled. In addition to unreacted monomer there was obtained sulfur dioxide and tetrafluoroethylene dimer. The distillation heel was dropped into water and the insoluble layer resulting was separated and distilled. On distillation there was obtained 0.9 g. of β-hydroperfluoroethyl fluosulfonate having a boiling point at 56–57° C. The structure of the compound was further verified by infrared and nuclear magnetic resonance analysis.

*Example IV*

Into a 320 ml. platinum lined autoclave was charged 11 g. of fluosulfonic acid and 20 g. of omega-hydroperfluorobutene. The reactor was agitated for 8 hours at 150° C. under autogenous pressure. Distillation of the reaction product resulted in isolation of 2.1 g. of 2,4-dihydroperfluorobutyl fluosulfonate, having a boiling point at 119° C.

*Example V*

Into a 320 ml. platinum lined autoclave was charged 70 g. of perfluoroheptene-1 and 15 g. of fluosulfonic acid. The reaction mixture was agitated for three hours at 150° C. under autogenous pressure. The resulting product was washed with water, sodium bicarbonate solution and again with water. The product was then filtered through anhydrous MgSO$_4$, and dried over CaSO$_4$. On distillation there was recovered 25 g. of unreacted olefin and 2.2 g. of β-hydroperfluoroheptyl fluosulfonate having a boiling point of 53.5 to 54.5 ° C. at a pressure of 18 mm. Hg.

*Example VI*

Into a 6″ x ⅜″ platinum tube was charged 4.3 g. of omega-hydroperfluoroctene-1 and 1.5 g. of fluosulfonic acid. The tube was agitated for 3 hours at 200° C. under autogenous pressure. Distillation of the reaction product resulted in recovery of 2.8 g. of the olefin and isolation of 1.5 g. of 2,8-dihydroperfluorooctyl fluosulfonate having a boiling point at 80 to 81° C. at a pressure of 8 mm. Hg. The structure of the compounds was confirmed by infrared and nuclear magnetic resonance analysis.

*Example VII*

Into a 320 ml. platinum lined autoclave was charged 200 ml. of β-hydroperfluoropropyl fluosulfonate and 2 g.

of tert.-butyl peroxide. The autoclave was heated to 140° C. and pressured with 400 p.s.i. of tetrafluoroethylene. The reaction vessel was agitated for 63 minutes at this pressure and at a temperature varying from 140 to 180° C. The reaction product was filtered and 104 g. of polytetrafluoroethylene was isolated.

The formation of the fluosulfonates of the present invention is independent of the chain length of the fluoroalkyl radical attached to the perfluorovinyl group of the olefin and proceeds equally well with a low molecular weight fluoroolefin as with a higher molecular weight fluoroolefin. In general olefins having from 2 to 20 carbon atoms are employed in the formation of the novel fluosulfonate compounds of the present invention.

The fluoroalkyl fluosulfonates of the present invention are to be distinguished from the fluoroalkane sulfonates from which they differ in structure and properties. The fluoroalkyl groups in the fluosulfonates are bonded to the sulfur atoms through an oxygen atom, whereas in the fluoroalkane sulfonates the fluoroalkyl group is bonded to the sulfur atom. The fluoroalkane sulfonates, furthermore, hydrolyze to fluoroalkane sulfonic acid, whereas the fluoroalkyl fluosulfonates hydrolyze to a carboxylic acid.

The perfluoroalkyl fluosulfonates prepared by the process of the present invention are highly valuable chemical intermediates. Thus the fluosulfonates may be employed to prepare highly fluorinated acids by base hydrolysis. The resulting 2-hydroperfluoroalkyl acids are useful as dispersing agents and may also be dehydrofluorinated to give rise to perfluoro-α,β-unsaturated carboxylic acids which may be employed as polymerization monomers. The perfluoroalkyl fluosulfonates of the present invention are furthermore useful as solvents and non-aqueous polymerization media for perfluorinated olefins, as shown by Example VII.

I claim:
1. A process for the preparation of substantially fluorinated alkyl fluosulfonates which comprises reacting an acid selected from the class consisting of sulfuric acid and fluosulfonic acid at a temperature of 100 to 400° C., when the acid is fluosulfonic acid and 200° C. to 400° C. when the acid is sulfuric acid, with a substantially fluorinated olefin having the formula

$$R-CF=CF_2$$

where R is a member of the class consisting of fluorine, perfluoroalkyl group and omega-hydroperfluoroalkyl groups, said alkyl group being unsubstituted and straight chain and containing up to 18 carbon atoms.

2. A process for the preparation of substantially fluorinated alkyl fluosulfonates which comprises reacting sulfuric acid at a temperature of 200 to 400° C. with a substantially fluorinated olefin having the formula $$R-CF=CF_2$$

where R is a member of the class consisting of fluorine, perfluoroalkyl group, and omega-hydroperfluoroalkyl groups, said alkyl group being unsubstituted and straight chain and containing up to 18 carbon atoms.

3. The process of claim 2 wherein the substantially fluorinated olefin is hexafluoropropylene.

4. The process of claim 2 wherein the substantially fluorinated olefin is tetrafluoroethylene.

5. The process of claim 2 wherein the substantially fluorinated olefin is perfluoroheptene-1.

References Cited in the file of this patent

UNITED STATES PATENTS

| | | |
|---|---|---|
| 2,570,917 | Calfee | Oct. 9, 1951 |
| 2,628,972 | Calfee et al. | Feb. 17, 1953 |
| 2,878,156 | Davis | Mar. 17, 1959 |

UNITED STATES PATENT OFFICE
CERTIFICATE OF CORRECTION

Patent No. 3,083,220                              March 26, 1963

William Lee Edens

It is hereby certified that error appears in the above numbered patent requiring correction and that the said Letters Patent should read as corrected below.

Column 1, line 29, for "ethylene" read -- ethylenes --; column 4, lines 12, 13, 22 and 23, for "group", each occurrence, read -- groups --; lines 25, 27 and 29, for the claim reference numeral "2", each occurrence, read -- 1 --.

Signed and sealed this 22nd day of October 1963.

(SEAL)
Attest:

ERNEST W. SWIDER
Attesting Officer

EDWIN L. REYNOLDS

Acting Commissioner of Patents